(12) United States Patent
Esswein et al.

(10) Patent No.: US 10,068,475 B2
(45) Date of Patent: Sep. 4, 2018

(54) SYSTEM FOR PROVIDING DATA FOR VEHICLES (71) Applicant: CONTINENTAL AUTOMOTIVE GMBH, Hannover (DE)

(72) Inventors: Dieter Esswein, Barbing (DE); Berthold Ernstberger, Neutraubling (DE)

(73) Assignee: Continental Automotive GmbH, Hannover (DE)

( * ) Notice: Subject to any disclaimer, the term of this patent is extended or adjusted under 35 U.S.C. 154(b) by 264 days.

(21) Appl. No.: 15/026,828

(22) PCT Filed: Sep. 26, 2014

(86) PCT No.: PCT/EP2014/070588
§ 371 (c)(1),
(2) Date: Jul. 18, 2016

(87) PCT Pub. No.: WO2015/049167
PCT Pub. Date: Apr. 9, 2015

(65) Prior Publication Data
US 2016/0314691 A1 Oct. 27, 2016

(30) Foreign Application Priority Data

Oct. 2, 2013 (DE) .................. 10 2013 220 023

(51) Int. Cl.
*G06F 7/00* (2006.01)
*G06G 7/70* (2006.01)
(Continued)

(52) U.S. Cl.
CPC ... *G08G 1/096844* (2013.01); *G01C 21/3415* (2013.01); *G01C 21/3691* (2013.01);
(Continued)

(58) Field of Classification Search
CPC ............ G01C 21/3415; G01C 21/3691; G08G 1/0145; G08G 1/096741; G08G 1/096775; G08G 1/096816; G08G 1/096844
(Continued)

(56) References Cited

U.S. PATENT DOCUMENTS 8,354,942 B2  1/2013 Stählin
2004/0104842 A1*  6/2004 Drury ................... G01C 21/34
                                                    342/357.31
(Continued)

FOREIGN PATENT DOCUMENTS

DE   10 2008 012 660 A1   12/2008
EP        2 354 760 A1    8/2011
(Continued)

*Primary Examiner* — Harry Y Oh
(74) *Attorney, Agent, or Firm* — Cozen O'Connor (57) ABSTRACT

A system for providing data for vehicles includes a region server for providing information data for vehicles in a region. A first and second of the vehicles predict path data, which indicate at least one route that the first and second vehicles will drive with a probability. The first and second vehicles are registered in the region server if the route of the first and second vehicles indicated by the predicted path data lies in the region. The region server produces the information data in dependence on received sensor data of the first vehicle. The produced information data are sent by the region server to the second vehicle if the predicted path data of the second vehicle overlap with the predicted path data of the first vehicle and the second vehicle is registered in the region server.

16 Claims, 4 Drawing Sheets

(51) Int. Cl.
  *G06G 7/76* (2006.01)
  *G08G 1/00* (2006.01)
  *G08G 1/0968* (2006.01)
  *G01C 21/34* (2006.01)
  *G01C 21/36* (2006.01)
  *G08G 1/01* (2006.01)
  *G08G 1/0967* (2006.01)

(52) U.S. Cl.
  CPC ......... *G08G 1/0112* (2013.01); *G08G 1/0133* (2013.01); *G08G 1/0145* (2013.01); *G08G 1/096741* (2013.01); *G08G 1/096775* (2013.01); *G08G 1/096811* (2013.01); *G08G 1/096816* (2013.01); *G08G 1/09685* (2013.01)

(58) Field of Classification Search
  USPC .......................................................... 701/117
  See application file for complete search history.

(56) References Cited

U.S. PATENT DOCUMENTS

| | | | | |
|---|---|---|---|---|
| 2004/0148090 | A1* | 7/2004 | Melen | G01C 21/26 701/482 |
| 2004/0207541 | A1* | 10/2004 | Choi | G01C 21/32 340/995.12 |
| 2005/0065711 | A1* | 3/2005 | Dahlgren | G07C 5/008 701/117 |
| 2007/0083328 | A1 | 4/2007 | Suzuki | |
| 2007/0142050 | A1 | 6/2007 | Handforth et al. | |
| 2010/0299370 | A1* | 11/2010 | Otto | G01C 21/32 707/803 |
| 2011/0125344 | A1 | 5/2011 | An et al. | |
| 2011/0130894 | A1* | 6/2011 | Kim | G05D 1/0282 701/2 |
| 2011/0130918 | A1* | 6/2011 | Kim | G01C 21/26 701/31.4 |
| 2011/0264363 | A1* | 10/2011 | Cabral | G01C 21/3492 701/532 |
| 2012/0271544 | A1* | 10/2012 | Hein | G01C 21/3407 701/423 |
| 2012/0310525 | A1* | 12/2012 | Sengoku | G01C 21/3469 701/423 |
| 2013/0054132 | A1* | 2/2013 | Conner | G01C 21/3407 701/411 |

FOREIGN PATENT DOCUMENTS

| | | |
|---|---|---|
| JP | 2012-221302 | 11/2012 |
| KR | 20090065987 A | 6/2009 |
| WO | WO 2007/067841 A2 | 6/2007 |

* cited by examiner

SYSTEM FOR PROVIDING DATA FOR VEHICLES

CROSS-REFERENCE TO RELATED APPLICATIONS

This is a U.S. national stage of application No. PCT/EP2014/070588, filed on 26 Sep. 2014, which claims priority to the German Application No. 10 2013 220 023.4 filed 2 Oct. 2013, the content of both incorporated herein by reference.

BACKGROUND OF THE INVENTION

1. Field of the Invention

The invention relates to a system for providing data for vehicles, the data being provided by different servers which are assigned a region. The invention also relates to a method for providing data for vehicles.

2. Related Art

During highly automated driving, it is necessary, during a journey of a vehicle, for information data, which provide the vehicle with an indication of a traffic situation, a road condition or a weather situation on a route for example, to be transmitted from a server to the vehicle. An area in which highly automated driving is possible can be subdivided into individual regions for this purpose, for example. A region server or a region control computer is provided for each region and can provide vehicles in the respective region with the information data. A central area server or area control computer can allocate the individual vehicles to the dedicated region servers, for example on the basis of a geoposition or further static attributes (telephone number, registration key, etc.). The information data are then communicated to the individual vehicles by the region server allocated to them.

If the mobile radio network is used to transmit data between the vehicles and the servers, there may be a high load on the mobile radio network in the case of a large volume of data. It is therefore necessary to efficiently distribute the transmission of messages between the servers and the vehicles in the case of a large volume of data.

SUMMARY OF THE INVENTION

An object of the present invention is to specify a system for providing data for vehicles, in which the load occurring in a communications network is reduced and the provision of the data for the vehicles is distributed as efficiently as possible to region servers of an area. Another object of the present invention is to specify a method for providing data for vehicles, in which the load occurring in a communications network on account of the transmission of data is reduced and the provision of the data is distributed as efficiently as possible to region servers of an area.

According to one embodiment, a system for providing data for vehicles comprises at least one first and one second one of the vehicles, and a region server for providing information data for the vehicles in a region, the information data containing an item of information for controlling the vehicles. The first and second vehicles are each configured to predict path data indicating at least one route that will probably be driven by the first and second vehicles in a time after predicting the path data. The first and second vehicles may have sensors for determining sensor data, the sensor data indicating a position of the respective vehicle and/or a state of the respective vehicle and/or a state of a location of the respective vehicle and/or a state of a respective driver of the first and second vehicles. The first and second vehicles are registered with the region server if the route of the first and second vehicles respectively indicated by the predicted path data is in the region. The first and second vehicles are also configured to transmit the respectively determined sensor data to the region server if the first and second vehicles are registered with the region server. The region server is configured to evaluate the sensor data received from the first vehicle and to generate the information data on the basis of the sensor data received from the first vehicle. The region server is configured to transmit the generated information data to the second vehicle if the predicted path data from the second vehicle overlap the predicted path data from the first vehicle and the second vehicle is registered with the region server.

One embodiment of a method for providing data for vehicles is is suitable, in particular, for being carried out by a system according to the invention. According to the method, a region server for providing information data for vehicles in a region should be provided, the information data containing an item of information for controlling the vehicles. A first and a second vehicle predict path data, the respective path data indicating at least one route that will probably be driven by the first and second vehicles in a time after predicting the path data. Sensors in the first and second vehicles determine sensor data, the sensor data indicating a position of the respective vehicle and a state of the respective vehicle and/or a state of the environment of the respective vehicle. The first and second vehicles are registered with the region server if the route of the first and second vehicles respectively indicated by the predicted path data is in the region. The sensor data determined by the first and second vehicles are transmitted to the region server if the first and second vehicles are registered with the region server. The region server evaluates the sensor data received from the first vehicle and generates the information data on the basis of the sensor data received from the first vehicle. The generated information data are transmitted to the second vehicle by the region server if the predicted path data from the second vehicle overlap the predicted path data from the first vehicle and the second vehicle is registered with the region server.

The system and the method enable prediction-based load distribution in the region of the region server for the purpose of assisting highly automated driving. In this case, the information data generated by the region server are not transmitted by the region server to all vehicles registered in the region of the region server. Instead, the region server transmits only to those vehicles whose predicted route is in a section of the region to which the transmission of the information data is relevant. This makes it possible to reduce the volume of traffic, when transmitting messages, to those vehicles situated in a particular road area of a larger region or will arrive there shortly. The region server can reduce the volume of data traffic to the vehicles registered in its region by evaluating the predicted path data from the individual vehicles.

Another embodiment of the invention provides an area server or area control computer for dividing an area into a plurality of regions. The vehicles which are in the area and participate in highly automated driving, for example, can transmit their predicted path data, which indicate a probable route, to the area server. The respective path data can be stored, for example, in a respective prediction database in the vehicles and can be transmitted to the area server. The area server can use the predicted path data to dynamically determine the size of those regions of the area for which the individual region servers are responsible. Furthermore, the area server can distribute the individual vehicles to the region servers on the basis of their predicted path data and can register the vehicles with the region servers for the purpose of transmitting information data.

The evaluation of predicted path data or a prediction database in the individual vehicles prevents information data from being transmitted by a region server to all vehicles registered in its region. Since the predicted path data or the prediction databases in a plurality of vehicles will overlap if the vehicles drive along similar routes and since a region server is responsible for certain predicted path data or for a certain database region of the prediction database, communication is automatically dynamically distributed between the region servers and the vehicles. This dynamization allows an adequate response to load situations. If necessary, the area server can be used to decrease or increase the size of the regions for which the respective region servers are responsible if the volume of data traffic becomes too large or too small for one of the region servers.

Since each vehicle receives only information data from one region server, load balancing can be easily and effectively implemented during data transmission. It is expected that the volumes of data on the region servers will increase greatly in the event of increased use of the functionalities of highly automated driving. Therefore, in future, it will not suffice for a central area server to manage all vehicles participating in automated operation. On the other hand, a static allocation of the vehicles, for example on the basis of their geo-position, does not cope with a changing volume of traffic.

The use of predicted path data or a prediction database, on the basis of which a future route of a vehicle can be determined, allows intelligent need-based load distribution. In contrast, exclusive use of a programmed route restricts the quality since manual interventions or forced route changes will result again and again. It is also an unnecessary restriction as a precondition for highly automated driving. Assigning vehicles on the basis of their predicted path data is therefore a compromise between transmitting information data to all vehicles and transmitting information data to vehicles on a predefined route.

Scalability of the size of the individual regions for which the region servers are responsible is enabled by a central entity using the already existing transfer algorithms between the region servers. As long as the predicted route or the prediction database is not selected to be too small, automatic hysteresis is guaranteed when changing between region servers, which hysteresis prevents permanent changing back and forth between the region servers. The communication bottleneck will be the connection to the vehicle. The predicted path data or the prediction database first of all allow(s) only probably relevant events to be reported to the region servers. Moving the transfer of vehicles to adjacent region servers within the responsible region servers that have a connection having a wide bandwidth means that the vehicle affected by a change will scarcely notice anything since its dedicated region server will change only when the old responsibility region is completely left. The load can be minimized with a corresponding configuration of the database sections allocated to the region servers. Even before starting communication with a vehicle, the new responsible region server will know the vehicle's current amount of data. During a transitional phase during which a predicted route wanders from a responsibility region of a region server, communication with the previously responsible region server is retained. Vehicle communication is therefore moved to the region server as long as the vehicle has not left the region of a dedicated region server.

BRIEF DESCRIPTION OF THE DRAWINGS

The invention is explained in more detail below using figures that show exemplary embodiments of the present invention and in which.

DETAILED DESCRIPTION OF THE PRESENTLY PREFERRED EMBODIMENTS

Figure 1:
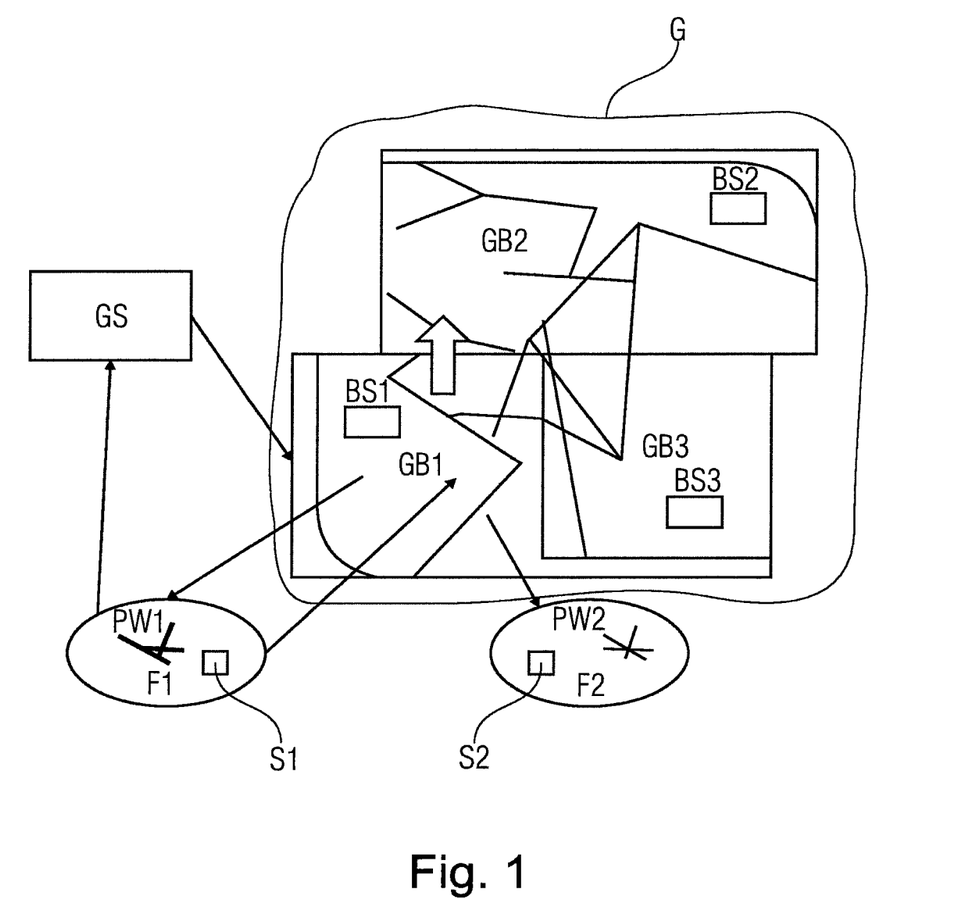
FIG. 1 shows an embodiment of a system and a method for providing data for vehicles.

FIG. 1 shows an embodiment of a system and a method for providing data for vehicles F1 and F2. An area G in which the vehicles may be situated is divided into regions GB1, GB2, GB3. Each of the regions is assigned a region server BS1, BS2, BS3 for providing information data for vehicles in the respective region. The information data provided by the region servers contain an item of information for controlling the vehicles.

The method of operation of the region servers is explained below using the region server BS1, which is allocated to the region GB1. The method of operation accordingly also applies to the region server BS2 allocated to the region GB2 and to the region server BS3 allocated to the region GB3.

The first vehicle F1 and the second vehicle F2 are configured to predict path data PW1, PW2 indicating at least one route that will be driven by the first and second vehicles F1, F2 with a certain probability in a time after predicting the path data. The path data therefore indicate a prediction of a future route of the vehicles F1 and F2. The predicted path data may indicate, for example, at least one route that will be driven by the vehicle in the next 10 to 30 minutes after predicting the path data. The first and second vehicles have sensors S1, S2 for determining sensor data. The sensor data may indicate a position of the respective vehicle and/or a state of the respective vehicle and/or a state of a location of the respective vehicle and/or a state of a driver of the respective vehicle, for example whether the driver is fatigued, lacks concentration or has possibly even fallen asleep.

The first and second vehicles F1, F2 are registered with that region server BS1, BS2 or BS3 in whose region the route of the respective vehicles indicated by the predicted path data lies. In the exemplary embodiment in FIG. 1, it is assumed, for example, that the routes of the vehicles F1, F2 indicated by the predicted path data PW1, PW2 are in the region GB1. The first and second vehicles F1, F2 are therefore registered with the region server BS1.

The first and second vehicles F1, F2 are also configured to transmit the respectively determined sensor data to that region server in whose responsibility region they are registered. In the exemplary embodiment illustrated in FIG. 1, the first and second vehicles F1, F2 therefore transmit the respectively determined sensor data to the region server BS1.

The region servers BS1, BS2 and BS3 are configured to evaluate the sensor data received from the vehicles registered in their responsibility region and to generate the information data on the basis of the received sensor data. In the exemplary embodiment in FIG. 1, the region server BS1, for example, is configured to evaluate the sensor data received from the first vehicle F1 and to generate the information data on the basis of the sensor data received from the first vehicle F1.

The region servers BS1, BS2 and BS3 are configured to transmit the information data generated by them to those of the vehicles registered with them whose predicted path data overlap the predicted path data from the vehicle, on the basis of whose sensor data the information data have been determined. In the exemplary embodiment in FIG. 1, it is assumed that the predicted path data PW2 from the second vehicle F2 overlap the predicted path data PW1 from the first vehicle F1. The region server BS1 can therefore assume that the second vehicle F2 will possibly soon enter that road region in the region GB1 in which or in the vicinity of which the first vehicle F1 is also situated.

Therefore, the information data, which have been determined by the region server BS1 using the sensor data from the first vehicle F1, may also be of interest or relevant to controlling the second vehicle F2 in the case of highly automated driving. All other vehicles likewise registered with the region server BS1 in the region GB1 but which are in more remote road sections of the region GB1 do not receive the information data determined on the basis of the sensor data from the first vehicle F1.

Therefore, the information data that have been determined on the basis of predicted path data from a vehicle or a prediction database containing the predicted path data are not transmitted to all vehicles registered with the region server BS1. Instead, prediction-based load distribution is carried out in a communications network, for example a mobile radio network, when distributing information data to the individual vehicles in the region.

According to another possible embodiment, the region server BS1 may be configured to transmit the generated information data to the second vehicle F2 if the location, on the basis of whose state the information data have been generated, is along the at least one route indicated by the predicted path data from the second vehicle F2. The region server BS1 transmits information data only to those vehicles in whose predicted driving range an event has occurred, which event is indicated by the information data. A vehicle is therefore informed of an event by the responsible region server only when the event is actually in the prediction region of the vehicle.

As a prerequisite for the stated method and system, it is assumed that each vehicle transmits its recorded sensor data, with geo-coordinates, to the region server with which the vehicle is registered and that there exists a mechanism that maps these coordinates to a road network. This process is usually referred to as "map matching". As a further assumption, all involved components, vehicles and servers must have a map database that allows road sections to be uniquely identified. In this case, a road section is defined as the longest distance between any two desired points (coordinates) without a further exiting road section.

Each vehicle participating in highly automated driving has predicted path data, which are stored, for example, in a prediction database and are continuously updated. The predicted path data contain, for example, possible road sections which will be driven along by a vehicle shortly, for example in the next few minutes. The predicted path data or the prediction database is/are transmitted to the dedicated region server with which the corresponding vehicle is registered.

The system or method for providing the data for vehicles also provides an area server GS configured to divide the area G into different regions. In the exemplary embodiment in FIG. 1, the area G is divided by the area server GS into the regions GB1, GB2 and GB3, for example. The vehicles are configured, in particular during initialization of the system, to transmit their respectively predicted path data PW1, PW2, PW3 to the area server GS. The area server GS is designed to determine a respective size of the regions GB1, GB2 and GB3 on the basis of the respectively predicted path data PW1, PW2 and PW3 from the vehicles. This makes it possible to ensure a uniform distribution of the vehicles to the existing region servers.

According to another possible embodiment, the area server GS may be configured, in particular during the first initialization or registration of vehicles in the system for highly automated driving, to register the vehicle with the corresponding region server depending on whether the route indicated by the respectively predicted path data from the corresponding vehicle is in a particular region. In the exemplary embodiment in FIG. 1, the vehicle F1, for example, transmits its predicted path data PW1 to the area server GS when first registered in the system. The area server GS evaluates the predicted path data PW1 from the vehicle F1 and uses this evaluation to determine a region server responsible for the vehicle F1. In the exemplary embodiment in FIG. 1, the region server BS1, for example, is determined for communication with the vehicle F1. The vehicle F1 is therefore registered with the region server BS1 in order to carry out further communication.

Figure 2:
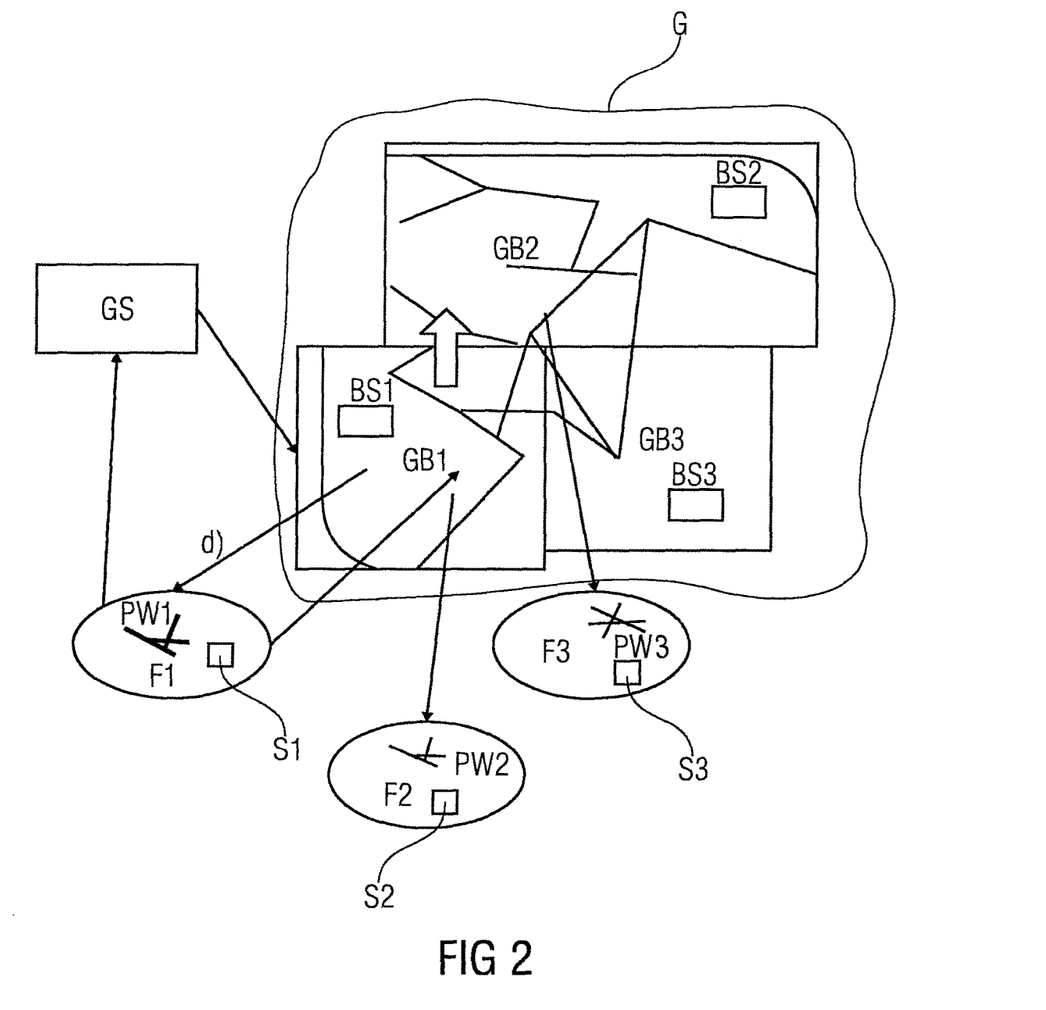
FIG. 2 shows a further embodiment of a system and a method for providing data for vehicles.

FIG. 2 shows a further possible embodiment of the system and the method for providing information data for vehicles, in particular in the case of highly automated driving. In the exemplary embodiment in FIG. 2, a vehicle F3 is assigned to a region server BS2, which is responsible for vehicles in the region GB2. Communication with the vehicle F3 is therefore carried out by the region server BS2. The region server BS1 is configured to transmit the information data determined on the basis of the sensor data from the first vehicle F1 to the further region server BS2 if the route indicated by the predicted path data PW1 from the first vehicle F1 is partially in the region GB1 and partially in the further region GB2 and the vehicle F1 is registered with the region server BS1.

In the exemplary embodiment in FIG. 2, the vehicle F3 predicts path data PW3 indicating at least one route which will probably be driven by the third vehicle F3 in the time after predicting the path data and which is in the region GB2 of the region server BS2. The third vehicle F3 is therefore registered with the further region server BS2. The further region server BS2 is configured to transmit the information data, which have been received from the region server BS1 and have been determined by the region server BS1 on the basis of sensor data from the first vehicle F1, to the third vehicle F3. Therefore, a vehicle that is located at the edge of a region, for example, also receives information from vehicles which are assigned to an adjacent region server.

According to another possible embodiment, a region server, with which a vehicle is registered, can allocate its own address (pseudo address) to a prediction region of the vehicle, that is to say a section of a region in which the at least one route assigned to the predicted path data lies, if the predicted route or the prediction region of the vehicle is at least partially in a region assigned to an adjacent region server. In the exemplary embodiment illustrated in FIG. 2, it is assumed that the vehicle F3, for example, for the first time has a prediction region which belongs partially to the region GB1 and partially to the region GB2. The region server BS2 allocates a pseudo address to this region, the pseudo address being the address of the region server BS2 itself. The pseudo address allocated to the prediction region of the vehicle F3 is transmitted from the region server BS2 to the region server BS1.

The region server BS1 now treats the prediction region of the vehicle F3 like a region in its own region GB1. The vehicle F3 still remains registered with the region server BS2. If the region server BS1 now generates information data indicating an event in the prediction region of the vehicle F3, the information data indicating the event are forwarded to the pseudo address and therefore to the region server BS2. The information data that have been generated by the region server BS1 are then transmitted from the region server BS2 to the vehicle F3.

Figure 3:
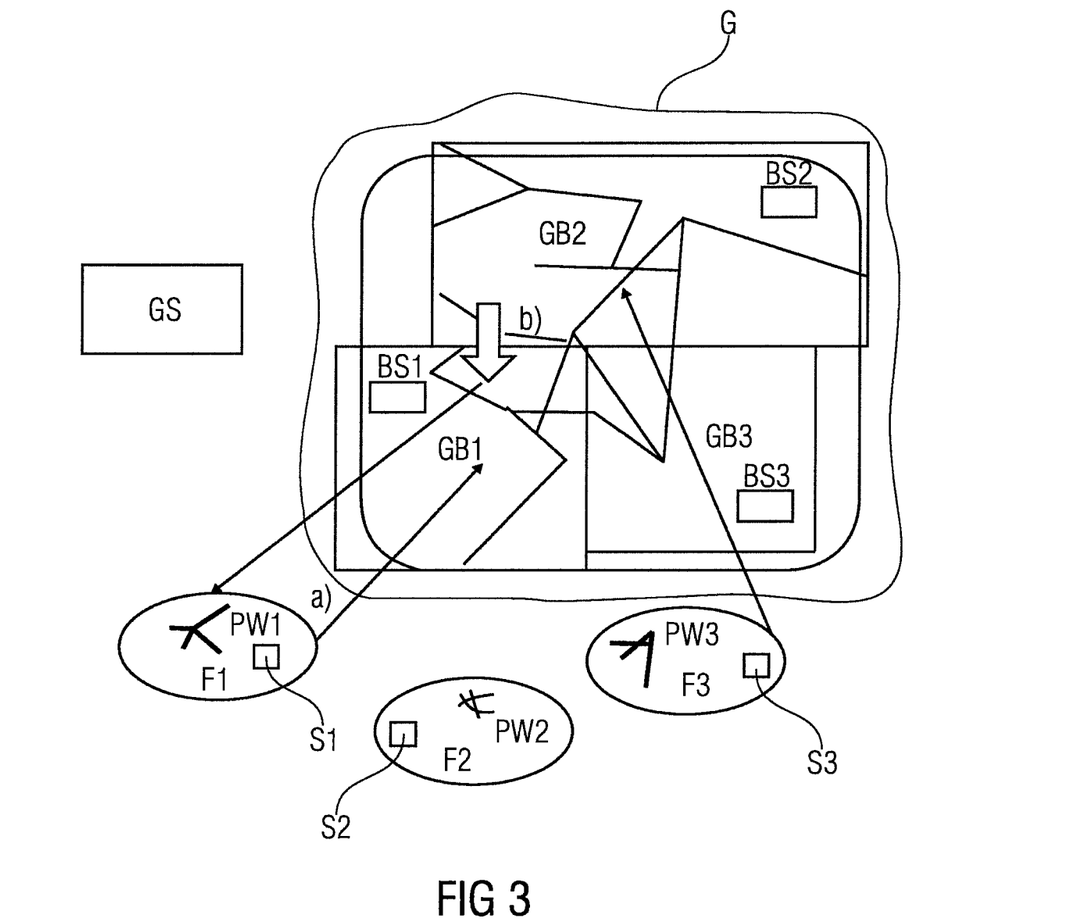
FIG. 3 shows a further embodiment of a system and a method for providing data for vehicles.

FIG. 3 shows a further embodiment of the system and method for providing information data for vehicles. In the exemplary embodiment in FIG. 3, the vehicles F1 and F2 are registered with the region server BS1 in a manner corresponding to FIG. 2. The vehicle F3 is registered with the region server BS2. The third vehicle F3 has sensors S3 for determining sensor data, the sensor data from the third vehicle F3 indicating a position of the third vehicle and/or a state of the third vehicle and/or a state of the environment of the third vehicle and/or a state of the driver of the third vehicle F3. The third vehicle F3 is designed to transmit the determined sensor data to the further region server BS2 with which the third vehicle F3 is registered. The region server BS2 is configured to evaluate the sensor data from the third vehicle F3 and to generate further information data on the basis of the sensor data from the third vehicle F3.

The further region server BS2 may also be configured to transmit the further information data to the region server BS1. The further information data are transmitted from the further region server BS2 to the region server BS1, in particular, when the predicted path data PW1, PW2 from one of the two vehicles F1, F2 registered with the region server BS1 indicate a route which is partially in the region GB1 and partially in the region GB2 and additionally when the vehicle F1, F2 is registered with the region server BS1. In this case, the further region server BS2 transmits the information data determined by it on the basis of the sensor data from the third vehicle F3 to the region server BS1, which in turn transmits the information data received from the further region server BS2 to that vehicle in the transitional region between the regions GB1 and GB2.

Figure 4:
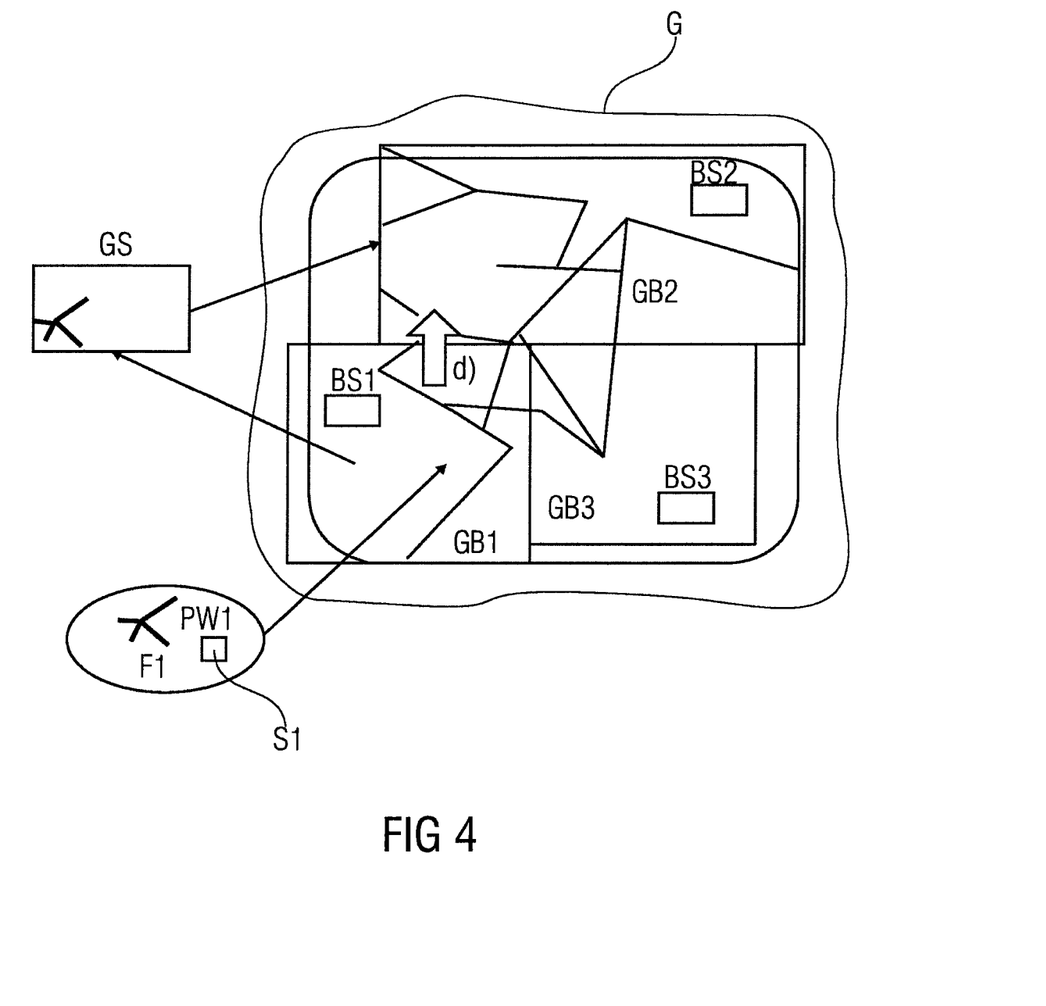
FIG. 4 shows a further embodiment of a system and a method for providing data for vehicles.

FIG. 4 shows a further embodiment of the system and method for providing information data for vehicles. In the exemplary embodiment in FIG. 4, it is assumed that the path data predicted by the first vehicle F1 or the prediction database PW1 indicate(s) to the region server BS1 that the first vehicle F1 will very probably soon leave the region GB1.

In this case, the region server BS1 can transmit the predicted path data received from the first vehicle F1 or the prediction database PW1 of the first vehicle F1 to the area server GS. The area server GS evaluates the predicted path data PW1 received from the first vehicle F1 and possibly determines a new responsible region server.

In the exemplary embodiment in FIG. 4, the area server GS, for example, determines that the predicted path data PW1 indicate a route which is assigned to the region GB2 of the region server BS2. In this case, the area server GS deletes the registration of the first vehicle F1 with the region server BS1 and instead registers the first vehicle F1 with the further region server BS2 in order to carry out further communication. In this case, the region server BS1 can transmit, for example, information data, which it has already determined using sensor data from the first vehicle F1, to the further region server BS2.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system comprising:
   a first vehicle configured to predict first vehicle path data indicating at least one route which will be driven by the first vehicle in a time after predicting the first vehicle path data, the first vehicle having sensors configured to determine sensor data of the first vehicle, the sensor data indicating a position of the first vehicle and/or a state of the first vehicle and/or a state of an environment of the first vehicle and/or a state of a driver of the first vehicle;
   a second vehicle configured to predict second vehicle path data indicating at least one route which will be driven by the second vehicle in a time after predicting the second vehicle path data, the second vehicle having sensors configured to determine sensor data of the second vehicle, the sensor data indicating a position of the second vehicle and/or a state of the second vehicle and/or a state of an environment of the second vehicle and/or a state of a driver of the second vehicle;
   a first region server configured to provide information data for the first and second vehicles in a first region, the first region being within an area, the information data containing an item of information for controlling the first and second vehicles;
   an area server configured to divide the area into the first region and into at least one further second region; and
   a second region server configured to provide further information data for vehicles in the second region,
   wherein:
   the first and second vehicles are registered with the first region server when the route of the first and second vehicles respectively indicated by the respective predicted first vehicle and second vehicle path data is in the first region,
   the first and second vehicles are configured to transmit the respectively determined sensor data to the first region server when the first and second vehicles are registered with the first region server,
   the first region server is configured to evaluate the sensor data received from the first vehicle and to generate the information data on the basis of the sensor data received from the first vehicle,
   the first region server is configured to transmit the generated information data to the second vehicle when the predicted second vehicle path data overlap the predicted first vehicle path data and the second vehicle is registered with the first region server, and the first region server is configured to transmit the information data determined on the basis of the sensor data from the first vehicle to the second region server when the route indicated by the predicted first vehicle path data is partially in the first region and partially in the second region and the first vehicle is registered with the first region server.

2. The system as claimed in claim 1, wherein the first region server is configured to transmit the generated information data to the second vehicle when the location of the second vehicle, on the basis of whose state the information data have been generated, is along the at least one route indicated by the predicted second vehicle path data.

3. The system as claimed in claim 1, further comprising:
a third vehicle configured to predict third vehicle path data indicating at least one route which will be driven by the third vehicle in the time after predicting the third vehicle path data,
wherein:
the first, second and third vehicles are each configured to transmit their respectively predicted first vehicle, second vehicle and third vehicle path data to the area server, and
the area server is configured to determine a respective size of the first region and of the second region on the basis of the respectively predicted first vehicle, second vehicle and third vehicle path data.

4. The system as claimed in claim 3, wherein:
the third vehicle is registered with the second region server when the route indicated by the predicted third vehicle path data is in the second region, and
the second region server is configured to transmit the information data received from the first region server to the third vehicle when the third vehicle is registered with the second region server.

5. The system as claimed in claim 4, wherein:
the third vehicle has sensors configured to determine the sensor data, the sensor data from the third vehicle indicating a position of the third vehicle and a state of the third vehicle and/or a state of the environment of the third vehicle,
the third vehicle is configured to transmit the sensor data from the third vehicle to the second region server when the third vehicle is registered with the second region server, and
the second region server is configured to evaluate the sensor data from the third vehicle and to generate the further information data on the basis of the sensor data from the third vehicle.

6. The system as claimed in claim 5, wherein:
the second region server is configured to transmit the further information data to the first region server, and
the first region server is configured to transmit the further information data to the first vehicle when the route indicated by the predicted first vehicle path data is partially in the first region and partially in the second region and the first vehicle is registered with the first region server.

7. The system as claimed in claim 6, wherein:
the registration of the first vehicle with the first region server is deleted when the route indicated by the predicted first vehicle path data is not in the first region, and the first vehicle is registered with the second region server when the route indicated by the predicted first vehicle path data is in the second region.

8. The system as claimed in claim 7, wherein:
the area server is configured to register the first, second and third vehicles with the first region server or the second region server based on whether the route indicated by the respective predicted first vehicle, second vehicle and third vehicle path data is in the first region or the second region.

9. The system as claimed in claim 1, wherein the sensor data and the information data is transmitted via a mobile radio network.

10. A method comprising:
providing a first region server configured to provide information data for a first vehicle and a second vehicle in a first region, the first region being within an area, the information data containing an item of information for controlling the first and second vehicles;
providing an area server configured to divide the area into the first region and into at least one further second region;
providing a second region server for providing further information data for vehicles in the second region;
the first vehicle predicting first vehicle path data, the first vehicle path data indicating at least one route which will be driven by the first vehicle in a time after predicting the first vehicle path data;
the first vehicle determining sensor data of the first vehicle by sensors in the first vehicle, the sensor data indicating a position of the first vehicle and/or a state of the first vehicle and/or a state of an environment of the first vehicle and/or a state of a respective driver of the first vehicle;
the second vehicle predicting second vehicle path data, the second vehicle path data indicating at least one route which will be driven by the second vehicle in a time after predicting the second vehicle path data;
the second vehicle determining sensor data of the second vehicle by sensors in the second vehicle, the sensor data indicating a position of the second vehicle and/or a state of the second vehicle and/or a state of an environment of the second vehicle and/or a state of a respective driver of the second vehicle;
registering the first and second vehicles with the first region server when the route of the first and second vehicles respectively indicated by the predicted first vehicle and second vehicle path data is in the first region;
transmitting the sensor data respectively determined by the first and second vehicles to the first region server when the first and second vehicles are registered with the first region server;
evaluating the sensor data received from the first vehicle and generating the information data on the basis of the sensor data received from the first vehicle by the first region server;
transmitting the generated information data to the second vehicle by the first region server when the predicted second vehicle path data overlap the predicted first vehicle path data and the second vehicle is registered with the first region server; and
transmitting the information data determined on the basis of the sensor data from the first vehicle to the second region server by the first region server when the route indicated by the predicted path data from the first vehicle is partially in the region and partially in the second region and the first vehicle is registered with the first region server.

11. The method as claimed in claim 10, further comprising:
transmitting the generated information data to the second vehicle by the first region server when the location of the second vehicle, on the basis of whose state the information data have been generated, is along the at least one route indicated by the predicted second vehicle path data.

12. The method as claimed in claim 10, further comprising:
providing a third vehicle configured to predict third vehicle path data indicating at least one route which will be driven by the third vehicle in the time after predicting the third vehicle path data;
transmitting the predicted first vehicle, second vehicle and third vehicle path data to the area server; and
determining a respective size of the first region and of the second region on the basis of the respectively predicted first vehicle, second vehicle and third vehicle path data by the area server.

13. The method as claimed in claim 12, further comprising:
predicting the third vehicle path data by the third vehicle;
registering the third vehicle with the second region server when route indicated by the predicted third vehicle path data is in the second region; and
transmitting the information data received from the first region server to the third vehicle by the second region server when the third vehicle is registered with the second region server.

14. The method as claimed in claim 13,
wherein the third vehicle has sensors configured to determine the sensor data, the sensor data from the third vehicle indicating a position of the third vehicle and a state of the third vehicle and/or a state of the environment of the third vehicle, the method further comprising:
transmitting the sensor data from the third vehicle to the second region server by the third vehicle when the third vehicle is registered with the second region server;
evaluating the sensor data from the third vehicle and generating the further information data on the basis of the sensor data from the third vehicle by the second region server;
transmitting the further information data to the first region server by the second region server; and
transmitting the further information data to the first vehicle by the first region server when the route indicated by the predicted first vehicle path data is partially in the region and partially in the second region and the first vehicle is registered with the first region server.

15. The method as claimed in 14, further comprising:
deleting the registration of the first vehicle with the first region server when the route indicated by the predicted first vehicle path data is not in the region; and
registering the first vehicle with the second region server when the route indicated by the predicted first vehicle path data is in the second region.

16. The method as claimed in claim 15, further comprising:
registering the first, second and third vehicles with the first region server or the second server by the area server based on whether the route indicated by the respective predicted first vehicle, second vehicle and third vehicle path data is in the region or the second region.

* * * * *